A. C. GILBERT.
CHURN OR AGITATOR.
APPLICATION FILED JAN. 28, 1918.
1,435,289.
Patented Nov. 14, 1922.
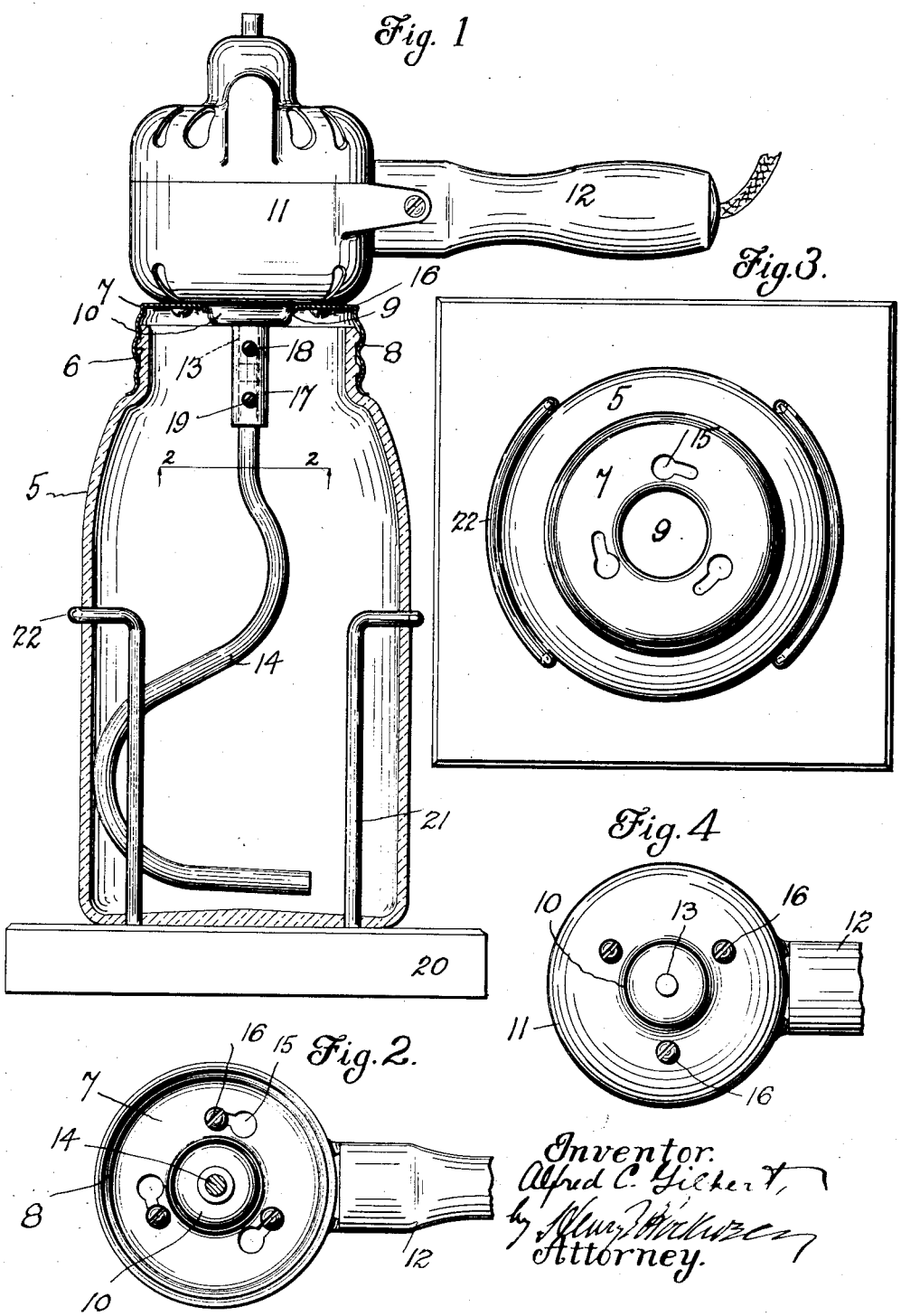

Patented Nov. 14, 1922.

1,435,289

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT, A CORPORATION OF CONNECTICUT.

CHURN OR AGITATOR.

Application filed January 28, 1918. Serial No. 214,140.

*To all whom it may concern:*

Be it known that I, ALFRED C. GILBERT, a citizen of the United States, residing in the city and county of New Haven, State of Connecticut, have invented certain new and useful Improvements in Churns or Agitators, of which the following is a full, clear, and exact description.

This invention relates to apparatus for agitating liquids or semi-solids, and it has particular reference to a device for churning milk, beating eggs, etc., in which a covered receptacle is used and a motor operated agitating or stirring element extends downward through the cover of the receptacle.

The primary object of the invention is to furnish a simple, efficient and readily portable device of this character. More particularly, it is aimed to furnish a device in which an electric motor for driving the stirring element is detachably supported on the cover of the receptacle. This receptacle may be constituted by a Mason jar, and in this case the electric motor will be attached to the screw threaded metal cover of the jar, in such a manner that the motor shaft with the stirrer thereon will extend down into the interior of the jar.

Another object of the invention is to provide a detachable connection between a portable electric motor and the cap or cover of a jar which permits the employment of the jar as a churn receptacle, while, nevertheless, the motor may be readily detached when it is desired to use it for some other purpose than churning or stirring.

Still another object of the invention is to provide a churn or agitator having a receptacle and cap similar to those of the ordinary Mason jar.

Still another object is to furnish means for properly supporting the jar during mixing and stirring, so that it will not turn over or upset by reason of the torque of the rotating motor.

To these and other ends, the invention consists in the novel features and combinations of parts to be hereinafter described and claimed.

In the accompanying drawing:

Fig. 1 is a side elevation partly in vertical section of a churn embodying my improvements;

Fig. 2 is a bottom view of the jar top secured to the motor, taken in section along the line 2—2 of Fig. 1;

Fig. 3 is a top view of the jar, showing it positioned upon its stand, the motor being omitted; and Fig. 4 is an end view of the motor, showing the headed members which engage the slots in the jar top, the stirrer being detached from the motor shaft.

The improved churn consists mainly of a receptacle and cover which may be similar to those of the ordinary Mason jar; a portable electric motor member associated with the jar cover and having a stirring or agitating element extending down into the interior of the jar; and preferably a stand for supporting the jar and preventing it from tipping over easily during the operation of churning, stirring, mixing, or beating. In the particular form shown, the receptacle 5 is an ordinary glass jar, having a threaded neck 6, and the cap or cover 7 of the jar is made of sheet metal and provided with threads 8 to engage those of the jar neck. The receptacle 5 and cover 7, shown in the drawing, are those of the ordinary Mason jar, except that the cap is provided with a central opening 9 which receives snugly a boss 10 formed on the lower end of an electric motor member 11 which rests on top of the cap. The motor member is preferably provided with a laterally extending handle 12, and is supplied with current in any well known manner, the shaft 13 of said motor being vertically disposed and passing downward through the boss 10 into the upper part of the jar, where it has secured thereto a suitable agitating or stirring element 14.

In order to secure the motor member 11 detachably on the cap or cover 7, the latter is provided at points around the opening 9 with key hole slots 15, and the motor member is provided around the boss 10 with headed screws or like fastening members 16 to engage these slots. Obviously, the motor member may be secured in place by setting it down on the cap so that its boss projects through the opening 9 and the screws 16 engage the larger ends of the key hole slots after which the motor member and cap are turned relatively to each other to lock the screws in the smaller ends of the slots. This particular form of connection is disclosed in an application of Oscar P. Erhardt for beverage mixer, Serial No. 205,791, and I make no claim to it per se.

In the particular form shown, the stirrer 14 (which may vary in type according to the work to be done) is constituted by a bent wire that is so shaped as to be particularly adapted for churning butter. The stirrer is secured to the motor shaft 13 in any convenient manner, for example, by means of a connecting sleeve 17, which is fitted over the lower end of the motor shaft and the upper end of the stirrer. This sleeve is clamped detachably to the motor shaft by a screw 18, and the stirrer is detachably clamped to it by a screw 19.

In order to prevent the jar from tipping over easily and to support it effectively during the churning or mixing operation, I prefer to employ a suitable supporting stand. In the example shown, a stand is used in which the lower portion of the jar may be readily fitted. The stand consists of a base 20 with means thereon presenting a socket into which the lower end of the jar is inserted. This means consists of a pair of wires bent into substantially U-shaped form in elevation and each having a pair of vertical legs 21 fitting at the lower ends into sockets of the base. At their upper intermediate portions 22, which are placed opposite each other, as shown in Fig. 3, the keeper members are curved to conform to the periphery of the jar, and the arrangement is such that they will grip the jar frictionally and hold it snugly, although permitting the ready removal of the jar from the stand when desired. It will be obvious that the torque of the motor, when the latter meets considerable resistance in churning or mixing, might be sufficient to tip over the jar, but this is prevented by the use of a stand of the character indicated.

Various changes may be made in the details of the construction without departing from the scope of the invention as defined in the claims.

What I claim is:

1. In a device such as described, a receptacle, a cover secured thereto, an electric motor member detachably secured on top of the cover, and an agitating element disposed in the receptacle and operatively connected with the motor.

2. The combination with a jar comprising a receptacle and a screw cap, said cap provided with an opening, of an electric motor member detachably secured on top of said cap and having a vertical shaft extending through said opening, and an agitating element detachably connected to said shaft below said opening and within said receptacle.

3. The combination with a portable electric motor member having a shaft, of a jar cover lying against one face of said motor member and having an opening for clearing said shaft, said means for interlocking and releasing said motor member and jar cover.

4. The combination with a portable electric motor member having a shaft, of a jar cover lying against one face of said motor member and having an opening for clearing said shaft, and means for interlocking and releasing said motor member and jar cover by relative turning movement thereof.

5. The combination with a motor member having a casing, a shaft, and a bearing boss for the shaft, projecting outwardly from one face of the casing, of a Mason jar cap lying alongside the face of the motor casing, and having an opening in which said boss snugly fits, and means for detachably securing the cap to the casing.

6. In an agitating device, a jar cap having an opening therein, an electric motor member having a shaft, and means for detachably securing said motor member on top of said cap with said shaft projecting through said opening.

7. In a device such as described, a portable motor member, a Mason jar cap adapted to be secured thereto at one face of said motor member, and a rotary lock between said motor member and said cap.

8. The combination with a Mason jar having a screw cap, of a motor member on top of the cap having a portion extending therethrough, and means for locking the motor member to the cap so as to be readily detached therefrom.

In witness thereof, I have hereunto set my hand on the 21st day of January, 1918.

ALFRED C. GILBERT.